United States Patent
Wigren

(10) Patent No.: US 8,170,582 B2
(45) Date of Patent: May 1, 2012

(54) EXTENDED POSITIONING REPORTING

(75) Inventor: Torbjorn Wigren, Uppsala (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 443 days.

(21) Appl. No.: 12/447,834

(22) PCT Filed: Oct. 30, 2006

(86) PCT No.: PCT/SE2006/050437
§ 371 (c)(1),
(2), (4) Date: Apr. 29, 2009

(87) PCT Pub. No.: WO2008/054271
PCT Pub. Date: May 8, 2008

(65) Prior Publication Data
US 2010/0075696 A1     Mar. 25, 2010

(51) Int. Cl.
*H04W 24/00* (2009.01)
(52) U.S. Cl. ........... 455/456.1; 455/456.2; 455/456.3
(58) Field of Classification Search .......... 455/456.1, 455/456.2, 456.3; 370/335, 342; 701/208; 751/214
See application file for complete search history.

(56) References Cited

U.S. PATENT DOCUMENTS

| | | | |
|---|---|---|---|
| 5,889,782 A | 3/1999 | Dendi | |
| 6,597,906 B1 * | 7/2003 | Van Leeuwen et al. | ... 455/422.1 |
| 7,720,431 B2 * | 5/2010 | Lee | ............... 455/3.01 |
| 2003/0216142 A1 | 11/2003 | Wigren | |

FOREIGN PATENT DOCUMENTS

| | | |
|---|---|---|
| EP | 0 796 020 A2 | 9/1997 |
| WO | WO 98/13764 A1 | 4/1998 |

OTHER PUBLICATIONS

International Search Report dated Jun. 27, 2007 (3 pages).

* cited by examiner

*Primary Examiner* — Temica M Beamer
(74) *Attorney, Agent, or Firm* — Myers Bigel Sibley & Sajovec, P.A.

(57) ABSTRACT

A method of transferring positioning information using a set of data having a standardized set of formats for a single position entity comprises inclusion (212) of data representing at least two separate position entities or an entity having information beyond the standardized set of formats in data containers intended for points defining corners of a single polygon. The method further comprising arranging (214) of data within the set of data according to predetermined rules as an indication of an existence of such data. The set of data is transferred (230) over a communication network. In the transferred set of data, the indication of an existence of such data is detected (224) and data representing the original position is extracted (226) from the data containers intended for points defining corners of a single polygon. A communication network node performing at least a reception part or a transmission part of the method above is also presented.

27 Claims, 10 Drawing Sheets

| 8 | 7 | 6 | 5 | 4 | 3 | 2 | 1 | |
|---|---|---|---|---|---|---|---|---|
| 0 | 1 | 0 | 1 | \multicolumn{4}{c|}{NO. OF POINTS} | OCTET 1 |

| S1 | | OCTET 2 |
| | | OCTET 3 |
| | | OCTET 4 |
| | | OCTET 5 |
| | | OCTET 6 |
| | | OCTET 7 |

⋮

| Sn | | OCTET 6n-4 |
| | | OCTET 6n-3 |
| | | OCTET 6n-2 |
| | | OCTET 6n-1 |
| | | OCTET 6n |
| | | OCTET 6n+1 |

Fig. 4

|   8   | 7 | 6 | 5 | 4 | 3 | 2 | 1 |
|---|---|---|---|---|---|---|---|
| 0 | 1 | 0 | 1 | 0 | 0 | 1 | 0 | OCTET 1
| S1 | | | | | | | | OCTET 2

OCTET 1
OCTET 2
OCTET 3
OCTET 4
OCTET 5
OCTET 6
OCTET 7
OCTET 8 (starts with S2)
OCTET 9
OCTET 10
OCTET 11
OCTET 12
OCTET 13

Fig. 6

EXTENDED POSITIONING REPORTING

TECHNICAL FIELD

The present invention relates in general to control signalling in cellular communication systems and in particular to transfer of data related to positioning.

BACKGROUND

Positioning in wireless communication systems can be performed in many different ways. A typical approach is that a request for positioning is provided. If the positioning information is not already available, some kind of measurement is performed, and positioning data is reported to a node responsible for the actual positioning.

There are a number of different reporting procedures for positioning data in wireless communication systems today. Most of them follow well standardized data format and signalling routines. For example, standard formats are available for reporting of the terminal position over RANAP (Radio Access Network Application Part) and PCAP (Position Calculation Application Part) in 3GPP systems. Reporting formats for a point or an area of different types are available.

However, the procedures for obtaining accurate positioning are developing very fast and several new approaches are proposed. Some of these approaches result in positioning data that does not comply with the available standards of today. Updating of different standards is a time-consuming and complex task and the request for using the new positioning methods as soon as possible rushes the implementation of the improvements. A general problem is thus that in order to allow for implementation of different improved positioning methods, reporting of positioning data has to be performed according to new manufacturer-specific non-standard protocols, which in turn limits the use to systems where all parts are provided by the same manufacturer.

SUMMARY

An object of the present invention is to facilitate the use of new positioning methods giving extended positioning data. A further object is to enable position data reporting for such extended position data over existing standard reporting formats.

The objects presented above are achieved by methods and devices according to the present patent claims. In general words, according to a first aspect, a method of transferring positioning information using a set of data having a standardized set of formats for a single position entity, comprises inclusion of data representing at least two separate position entities or an entity having information beyond the standardized set of formats in data containers intended for points defining corners of a single polygon. The method further comprising arranging of data within the set of data according to predetermined rules as an indication of an existence of the at least two separate position entities or the entity having information beyond the standardized set of formats. The set of data is transferred over a communication network. In the transferred set of data, the indication of an existence of the at least two separate position entities or the entity having information beyond the standardized set of formats is detected and data representing the at least two separate position entities or the entity having information beyond the standardized set of formats is extracted from the data containers intended for points defining corners of a single polygon.

In a second aspect, a method of transmitting positioning information using a set of data having a standardized set of formats for a single position entity comprises inclusion of data representing at least two separate position entities or an entity having information beyond the standardized set of formats in data containers intended for points defining corners of a single polygon. The method further comprising arranging of data within the set of data according to predetermined rules as an indication of an existence of the at least two separate position entities or the entity having information beyond the standardized set of formats. The set of data is transmitted to a communication network.

In a third aspect, a method of receiving positioning information using a set of data having a standardized set of formats for a single position entity comprises reception of a set of data over a communication network. In the received set of data, an indication of an existence of at least two separate position entities or an entity having information beyond the standardized set of formats is detected and data representing the at least two separate position entities or the entity having information beyond the standardized set of formats is extracted from the data containers intended for points defining corners of a single polygon.

In a fourth aspect, a communication network node comprises a transmitter, arranged for transmitting positioning information using a set of data having a standardized set of formats for a single position entity and a processor, arranged for including data representing at least two separate position entities or an entity having information beyond the standardized set of formats in data containers intended for points defining corners of a single polygon. The processor is further arranged for arranging data within the set of data according to predetermined rules as an indication of an existence of the at least two separate position entities or the entity having information beyond the standardized set of formats. The processor is connected to the transmitter for allowing transmission of the set of data to the communication network.

In a fifth aspect, a communication network node comprises a receiver, arranged for receiving positioning information using a set of data having a standardized set of formats for a single position entity and a processor, connected to the receiver and arranged for reception of a set of data from the communication network. The processor is arranged for detecting an indication within the set of data of an existence of at least two separate position entities or an entity having information beyond the standardized set of formats. The processor is further arranged for extracting data representing the at least two separate position entities or the entity having information beyond the standardized set of formats from data containers intended for points defining corners of a single polygon.

In a sixth aspect, a communication network comprising at least one communication network node according to the fourth and/or fifth aspect.

One obvious advantage of the present invention is that enhanced precision positioning can be implemented in wireless communication systems without waiting for data container format changes to be implemented in reporting standards.

BRIEF DESCRIPTION OF THE DRAWINGS

The invention, together with further objects and advantages thereof, may best be understood by making reference to the following description taken together with the accompanying drawings, in which:

FIG. 4 is an illustration of a standard format of a polygon reporting information entity;

FIG. 6 is an embodiment of a polygon information entity comprising two point data entities;

DETAILED DESCRIPTION

In the present disclosure, a WCDMA system is used as a model system. However, anyone skilled in the art realizes that the basic principles of the present invention are applicable also to other wireless communication system, such as e.g. GSM. The invention is thus not limited to the exemplifying embodiments as such.

Figure 1:
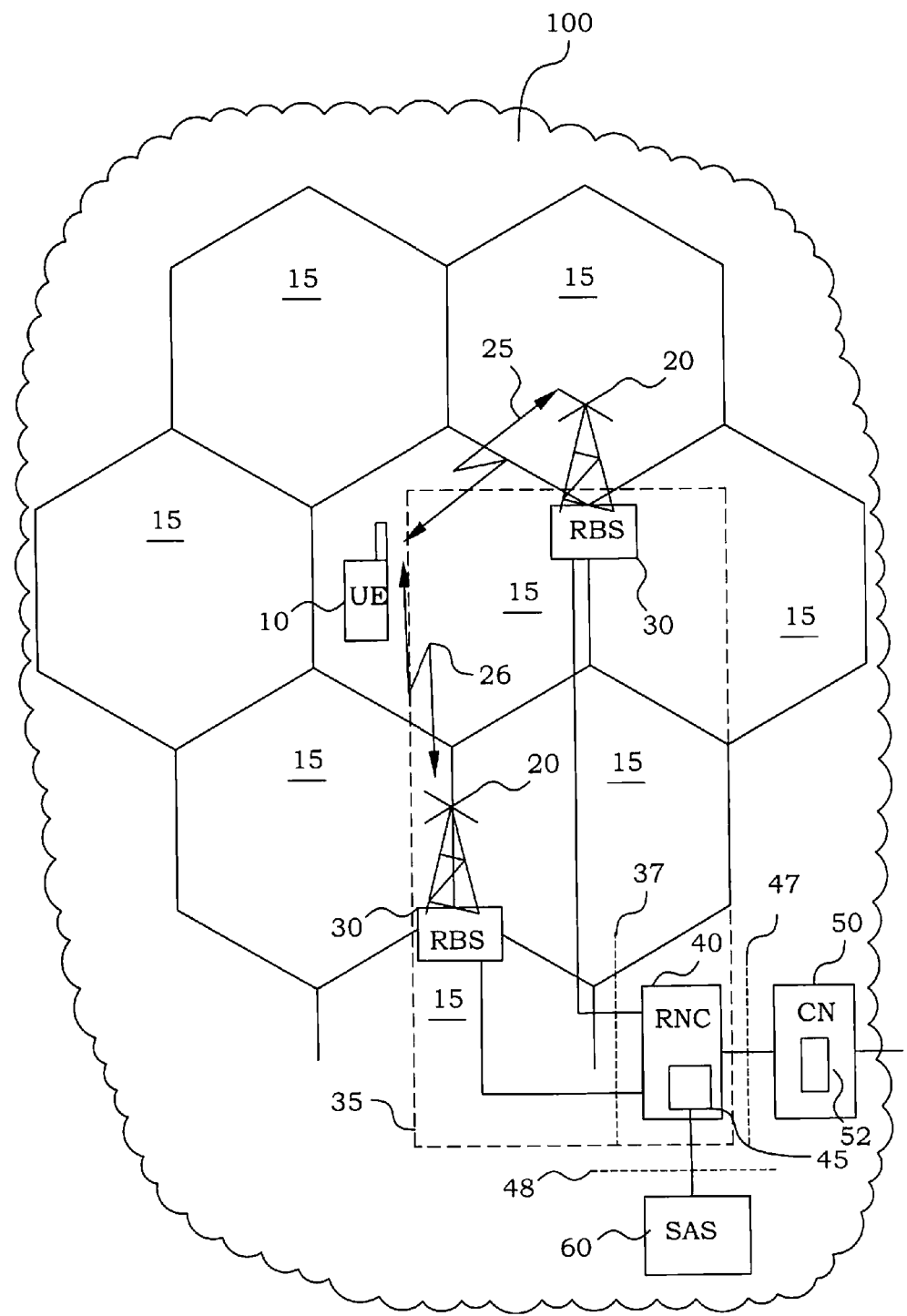
FIG. 1 is a block diagram of a general communication system.

FIG. 1 illustrates a general WCDMA system 100. Radio base stations 30 (RBS) are spread over the coverage area of the system and serves antennas 20, which in this particular embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. A user equipment (UE) 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to a Core Network (CN) 50 of the communications system 100 via a RANAP (Radio Access Network Application Part) Iu interface 47. A node 52 in the Core Network (CN) 50 may thereby communicate with the RNC 40, e.g. for receiving positioning data. The RNC 40 can further be connected to a stand-alone A-GPS SMLC (SAS) 60 via a Positioning Calculation Application Part (PCAP) Iupc interface 48.

A user equipment (UE) 10 is situated in the area covered by the cellular communications system 100. The user equipment communicates with the own radio base station 30 through signals 25. However, also signals 26 from and to neighbouring RBSs 30 may be possible to detect and may in such cases be utilized e.g. for positioning purposes.

When a positioning request occurs, typically in a node 52 of the CN 50, the positioning request is provided to the positioning node 45 of the RNC 40 over the RANAP interface 47. The RNC creates control signalling ordering position measurements, performed by the UE 10 if e.g. downlink signals are involved. OTDOA, RTT and user terminal based A-GPS are examples when the UE 10 is active in measuring ranging signals. The UE 10 then returns measurement data or, if the actual positioning is performed in the UE 10, position data to the RNC 40. Alternatively, the UE 10 may be instructed to transmit ranging signals, which are measurable by the base stations. Examples of such positioning is e.g. U-TDOA. The RNC 40 treats the data and provides position data. In case of user equipment assisted A-GPS, the SAS node 60 can make the actual positioning and provide the position data to the RNC 40 over the PCAP interface 48. The RNC 40 provides the position data over the RANAP interface 47 to the requesting node 52.

It can be noted that position data of different kinds are transmitted over the communication system between different nodes over a number of different interfaces, e.g. the RANAP interface 47, the PCAP interface 48 and the RRC interface 37.

The 3GPP standard has a number of allowed formats of data containers intended for position data for the geographical area IE of the RANAP and PCAP interfaces. There are seven formats that are available for reporting of the terminal position. These are an ellipsoid point, an ellipsoid point with uncertainty circle, an ellipsoid point with uncertainty ellipse, a polygon, an ellipsoid point with altitude, an ellipsoid point with altitude and uncertainty ellipsoid, and an ellipsoid arc. All formats are used in combination with the WGS 84 earth model. The formats have the following properties.

The point formats express the terminal position with a latitude and a longitude, possibly also including an altitude and an uncertainty measure.

Figure 2:
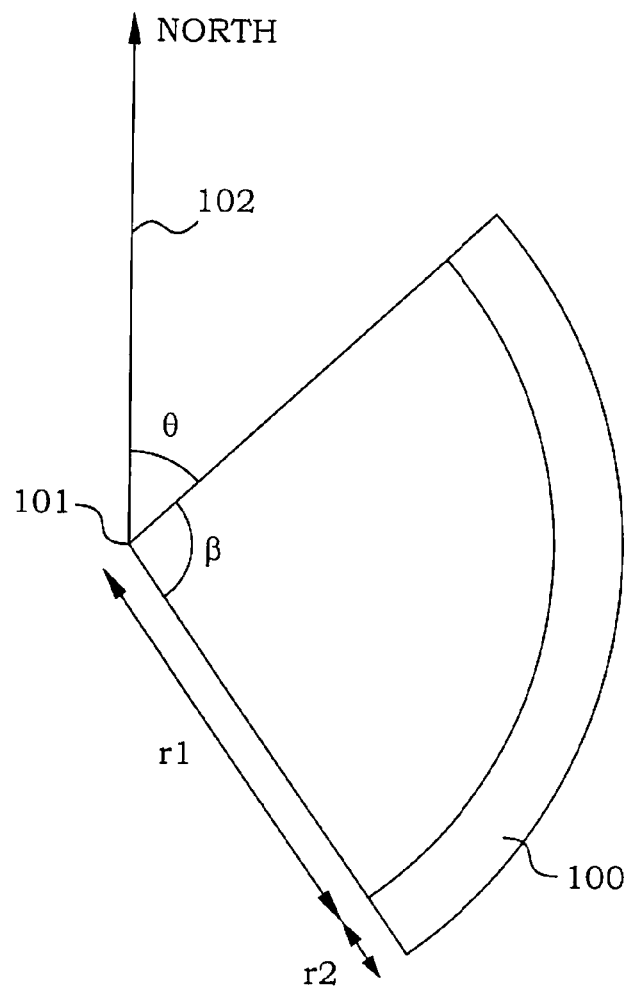
FIG. 2 is an illustration of an area defined in an ellipsoid format.

The ellipsoid arc format is a special format and tailored for so called RTT positioning (Round Trip Time), see description further below. FIG. 2 illustrates an ellipsoid arc area 100. The format expresses geographical coordinates of a terminal position in terms of a latitude and a longitude of a base point 101, being the centre of an arc 100 of a certain thickness. The format defines an inner radius r1 and an uncertainty radius r2, i.e. arc thickness, and further an offset angle θ relative the north direction 102 and an included angle β relative the offset angle θ.

Figure 3:
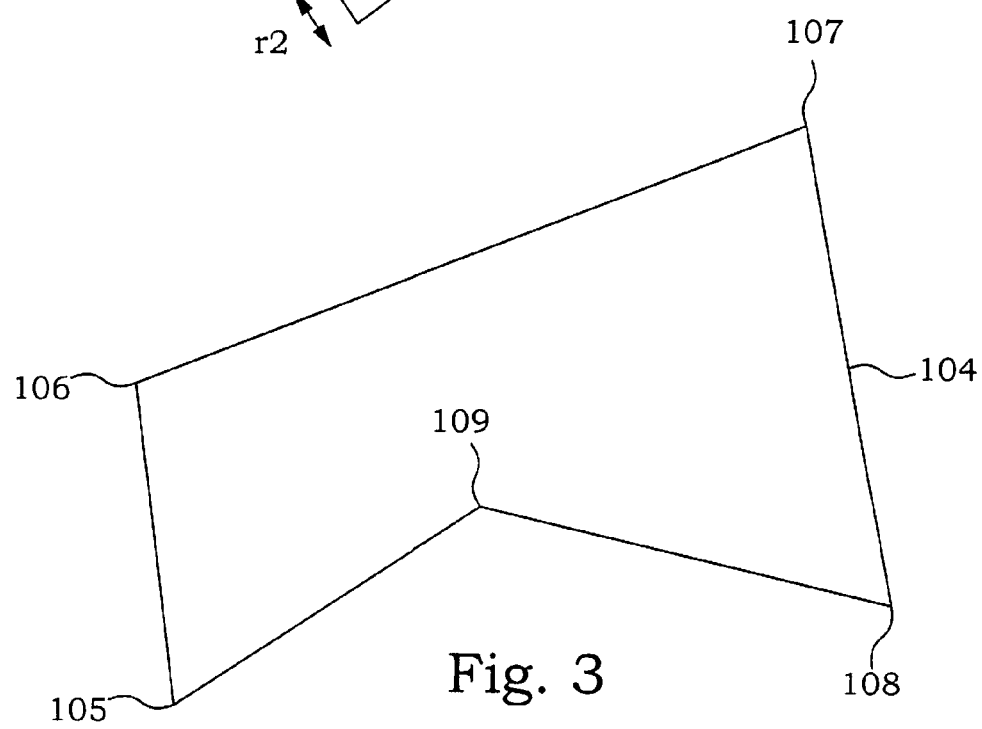
FIG. 3 is an illustration of a polygon.

The polygon format expresses the terminal position as a polygon. FIG. 3 illustrates a number of corner points 105-109 forming a polygon 104 in which the terminal is located. The polygon format comprises a list of corner points 105-109, each corner point 105-109 expressed as a latitude and a longitude. The polygon format is best described by FIG. 4. Each row describes an octet, and the total number of octets is determined by the number of points. The first octet includes a header of a shape type description field of four digital bits. A certain digital combination will inform any user that the present format is to be used. The first octet also comprises a number of point fields, which is encoded in binary on four bits. The maximum number of points N in the description will therefore be 15. The description of each point will be divided into two parts. A latitude is defined by the first three octets, i.e. 24 bits. One bit is used to define the sign and a number ranging between 0 and $2^{23}-1$ is coded in binary on 23 bits. The number can be translated into latitude. A longitude is defined by the next three octets, i.e. 24 bits. The longitude is represented by a number between $-2^{23}$ and $2^{23}-1$, corresponding to $-180°$ and $180°$. The number is coded in 2's complement binary on 24 bits. Further restrictions are specified in order to ensure that the points correctly can be interpreted as a polygon. The minimum number of points is thereby set to 3. The polygon is furthermore not allowed to intersect itself. A special case of the latter conditions is that all points need to be different.

The 3GPP positioning procedures over RANAP and PCAP are organized according to a one request—one reply configuration. It is also possible to set up periodic reporting procedures. However, the common assumption in such cases is that the same positioning method is applied and that the response is of the same type during the whole duration of the periodic positioning reporting period. Furthermore, the selection of positioning method is closely tied to the geometry of the shape used for position reporting over RANAP and PCAP. Typically the result of a cell ID positioning is reported by the use of a polygon format, the result of an MT positioning is reported by the use of an ellipsoid arc format, whereas A-GPS reporting usually exploits one of several ellipsoid point formats. For emergency positioning in North-America, the ellipsoid point with or without uncertainty circle and without altitude, is preferred.

Detailed information about positioning procedures and messages are easily obtained from the 3GPP Internet site, down to the most detailed information element level. Only parts that in some sense influence the present invention will be discussed.

In 3GPP release 5, a "Position Data" information element container was introduced in the LOCATION REPORT message of RANAP. A similar introduction followed in PCAP. Basically, the "Position Data" information element container, in particular at least one item of the "Positioning Method and Usage" IE, allows reporting of which positioning method(s) that have been applied in the RNC or the SAS in order to arrive at the reported terminal position. The information element includes a number of reserved methods, like cell ID and A-GPS, as well as network specific positioning methods. The additional information carried by the "Position Data" information element is a suitable tool for enabling the present invention, even if other solutions are present. The present invention thus exploits the information to extend the reporting format capabilities over RANAP and PCAP.

The "Positioning Method and Usage" IE of the "Position Data" container, introduces a possibility to report which positioning method that was used to obtain the reported position result. The "Positioning Method and Usage" IE defines a set of reserved codes for established positioning method, e.g. A-GPS and a set of codes reserved for "network specific" positioning methods. These codes are encoded in bits 4-8 of an IE, where bits 1-3 express e.g. whether the positioning failed or not.

In the published U.S. patent application US 2003/0216142, a method for construction of altitude information for polygons is disclosed. The methods exploit various models for the variation of the altitude on the boundary and the interior of the polygon. Using different criteria, altitude parameters are then derived that represent the altitude variation over the polygon in the best way, according to the selected criterion. The parameters of such a method can not be reported using the standard formats described above.

There are also positioning approaches giving a resulting position estimate as an alternative between two well separated positions. One example is "multi-leg" RTT positioning but with only two RBSs in soft handover. The terminal position is in such cases determined by the intersection of two circular strips, a situation that typically results in two solution regions. Multi-leg RTT is limited, it is offered by some WCDMA vendors.

Distributed cell coverage in cell ID positioning may give rise to separate, non-overlapping regions of the cell, each one intended to be reported as a point. A further interesting case would be to add remote coverage spots to a cell polygon that describes the main coverage area of a cell. Also in soft handover based positioning, where separate regions of the soft handover region are reported as points, gives rise to situations where multiple points are of interest to be transferred as specification of an estimate of a single position request. This is also the case e.g. in ambiguous cases in UE assisted A-GPS, U-TDOA and OTDOA positioning, where the positioning measurements are affected by non-line-of-sight propagation. Such situations may result in spread-out hyperbolic intersection regions without any small unique region of intersection. A number of solutions to the position calculation problem may rather exist. Such multiple points as reply on a single position request can not be transferred using the standard formats described above.

There are also approaches of positioning giving rise to regions limited by more than one polygon. In some cases two or more separate areas are the result from the position estimation, which areas are defined by separate polygons. In other cases, the position estimate can be a single area with an interior excluded portion. The outer boundary of the area can then be described by one polygon, whereas the excluded portion can be described by another polygon. Such position data provided as reply on a single position request can not be transferred using the standard formats described above. A further example where multiple polygons may be requested is in distributed cell coverage, due to the use of multiple radio heads per cell, e.g. in main-remote, repeater or indoor applications.

From the examples described above, it is obvious that there are needs for more flexible data position formats.

A general idea of the present invention is to utilize the present format standards in a non-intended way, but that still enables the position data to be transmitted using standard communication protocols. The polygon format of e.g. the RANAP and PCAP allows reporting of a list of up to 15 points expressed in WGS 84 latitudes and longitudes. This format is relatively flexible and contains much information, which can be used in different ways. The present invention introduces new encoding rules of the standardized polygon format, thereby being modified so that more advanced position information can be carried over the different interfaces, e.g. RANAP and PCAP. The limitations listed above are then removed. An indication of the use of the new encoding rules is introduced by arranging data within the reported set of data according to predetermined rules known by the transmitting node and the receiving node. Such an indication can be achieved by the polygon data itself, or by any data attached to the same report as the polygon data.

Figure 5:
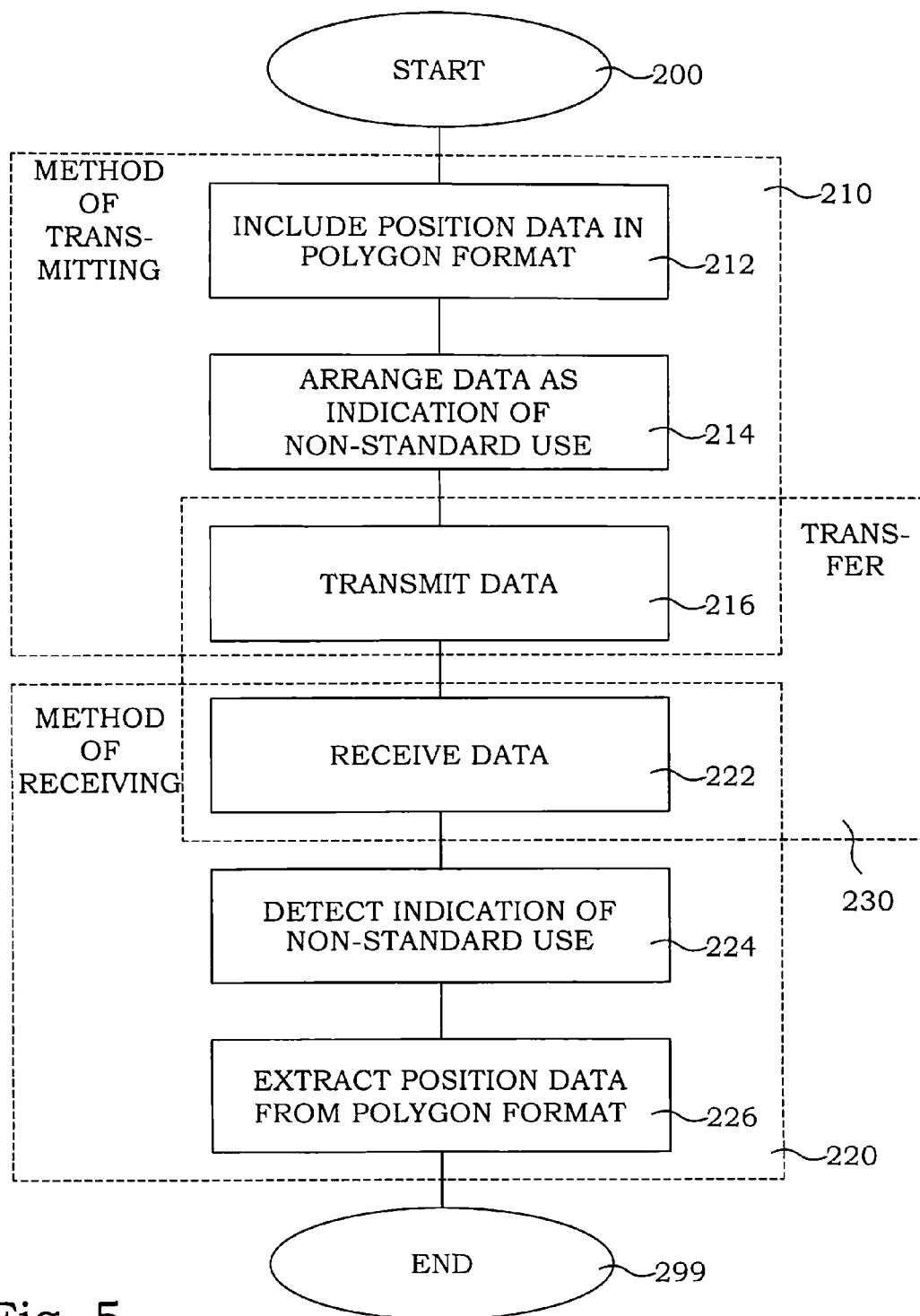
FIG. 5 is a flow diagram of steps of an embodiment of a method according to the present invention.

FIG. 5 illustrates a flow diagram of steps of an embodiment of a method according to the present invention. The method of transferring positioning information using a set of data having a standardized set of formats for a single position entity starts in step 200. In step 212, data representing a position is included in data positions intended for points defining corners of a single polygon. The data representing a position comprises data that is not compatible with the single polygon format according to the standard. One type of such data representing a position comprises at least two separate position entities. The at least two separate position entities are in one embodiment at least two separate points, and in another embodiment are at least two separate polygons. Another type of such data representing a position comprises a position entity having information beyond the standardized set of formats. In one embodiment, the position entity having information beyond the standardized set of formats is a polygon with altitude information.

In step 214, data within the set of data is arranged according to predetermined rules as an indication of an existence of the at least two separate position entities or the data representing a position comprises a position entity having information beyond the standardized set of formats. In step 230, the set of data is transferred over a communication network. The transferring step 230 can be divided in the sub-steps of transmitting 216 the set of data from a transmitter to a communication network and of receiving 222 the set of data in a receiver over a communication network. In step 224, the indication within the set of data of an existence of the at least two separate position entities or the position entity having information beyond the standardized set of formats is detected in the receiver. In step 226, the data representing the at least two separate position entities or the position entity having information beyond the standardized set of formats is extracted from the data positions intended for points defining corners of a single polygon.

The method illustrated in FIG. 5 is evidently performed over a communication network, from a transmitter to a receiver. Two part methods are consequently also present. One method of transmitting positioning information using a set of data having a standardized set of formats for a single position entity is defined by the steps 212, 214 and 216, as indicated by the box 210. One method of receiving positioning information using a set of data having a standardized set of formats for a single position entity is defined by the steps 222, 224 and 226, as indicated by the box 220.

It should be noted that the reporting becomes proprietary and has to be agreed between nodes on either side of the communication network, e.g. on either side of RANAP or PCAP. The reporting typically affects the RNC, the MSC and the SAS node on the other side of the RANAP interface. The modified encoding rules must furthermore maintain the standardized rules of polygon encoding necessary to ensure a trouble-free transmission.

The indication within the set of data of an existence of the at least two separate position entities or the position entity having information beyond the standardized set of formats can be designed in many different ways. In a first approach the indication is an intentional violation of selected rules for the points defining corners of a single polygon. Such intentional violation of the possibility to create a polygon has to be of such nature that it does not violate the actual transmitting of the data. However, there are additional rules for the polygon format which only serve the purpose of ensuring that the transmitted data can be interpreted as a single polygon, i.e. polygon creation rules. For instance, in the standard, it is given that at least three corner points have to be provided. This is quite obvious, since no polygon having a non-vanishing inner area is possible to construct from fewer than three points. However, the actual data transmitting can be performed over RANAP also with one or two points, see e.g. the RANAP specification 3GPP TS 25.413, vers. 7.1, section 2.3.11. By intentionally transmitting fewer than three points defining corners of a single polygon, an intentional violation of rules for the points is provided. This intentional violation can be detected by the receiver and interpreted as an indication of non-standard use of the polygon format. The transmitted two points can e.g. be interpreted as two separate points, e.g. as provided by a "two-leg" RTT positioning. A polygon information entity (IE) comprising such dual point data is illustrated in FIG. 6.

Figure 7:
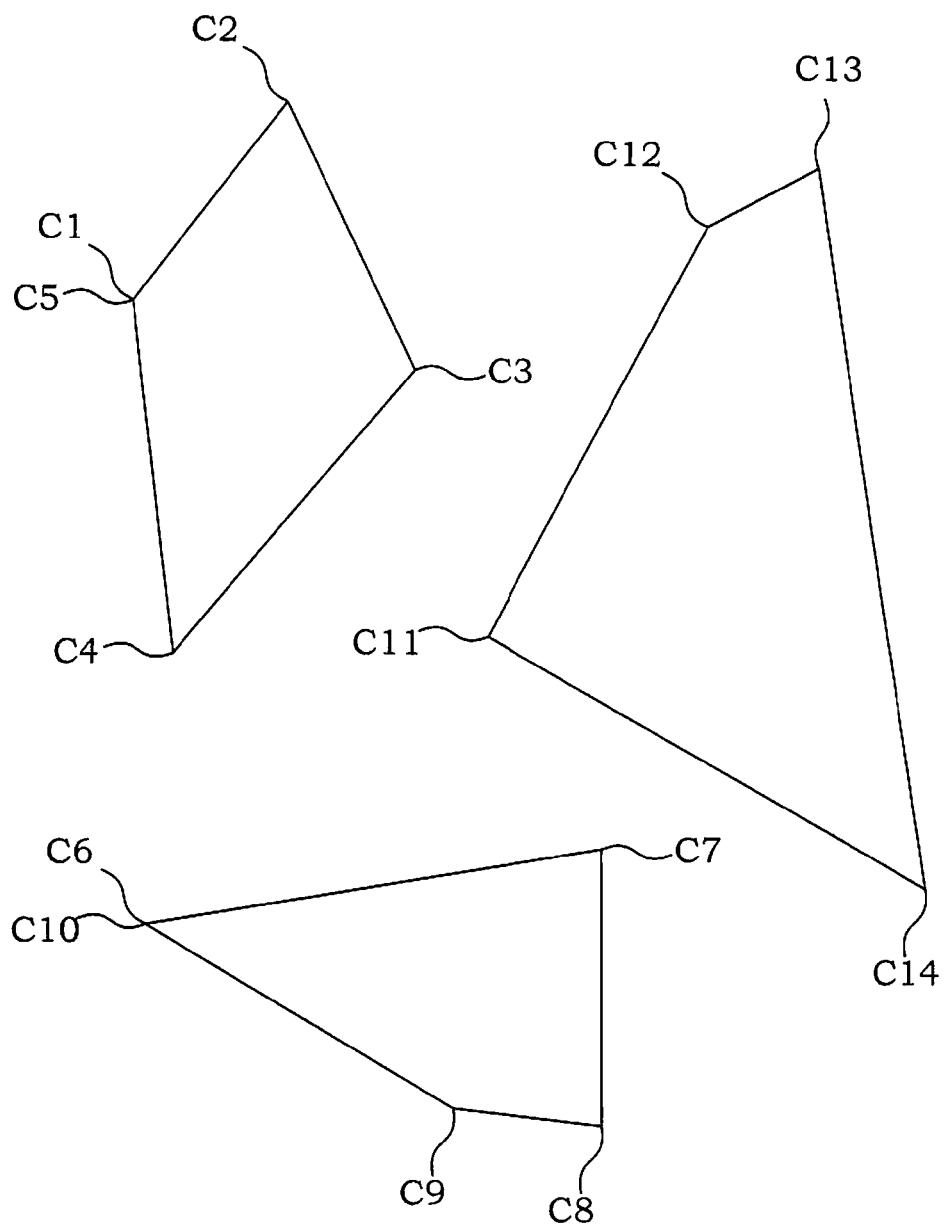
FIG. 7 is an illustration of three separate polygons.

Another requirement in the rules for normal use of the polygon format is that no two points should be identical. Also this is a request for ensuring that a proper polygon should be possible to construct. However, from a transmission point of view, identical points can be used. If multiple polygons are intended to be reported, the points of the first polygon can be provided, and as the indication of the non-standard use, the first point can be repeated. The receiver knows, when it detects the identical point that the first polygon is complete and that a second polygon is to be expected. FIG. 7 illustrates a situation where three polygons are reported, having four corners (C1-C4, C6-C9, C11-C14) each. By reporting the point C1 also as a point C5, this indicates that a new polygon is to begin in the next point. Likewise, by introducing a point C10 identical to point C6, this indicates the end of the second polygon.

In another embodiment, the points indicating the start of a new polygon do not have to be exactly identical to a previous point. If the point is close enough, a similar interpretation can be performed. The rules for being able to create a polygon are not directly violated, but the point data is anyway unsuited for polygon creation. The indication is in such a case an intentional inconsistency in the points defining corners of a single polygon. The intentional inconsistency is thereby that two points of the points defining corners of a single polygon are located closer to each other than a predetermined distance, whereby the predetermined distance is unreasonable for two corners of a true polygon.

Figure 8:
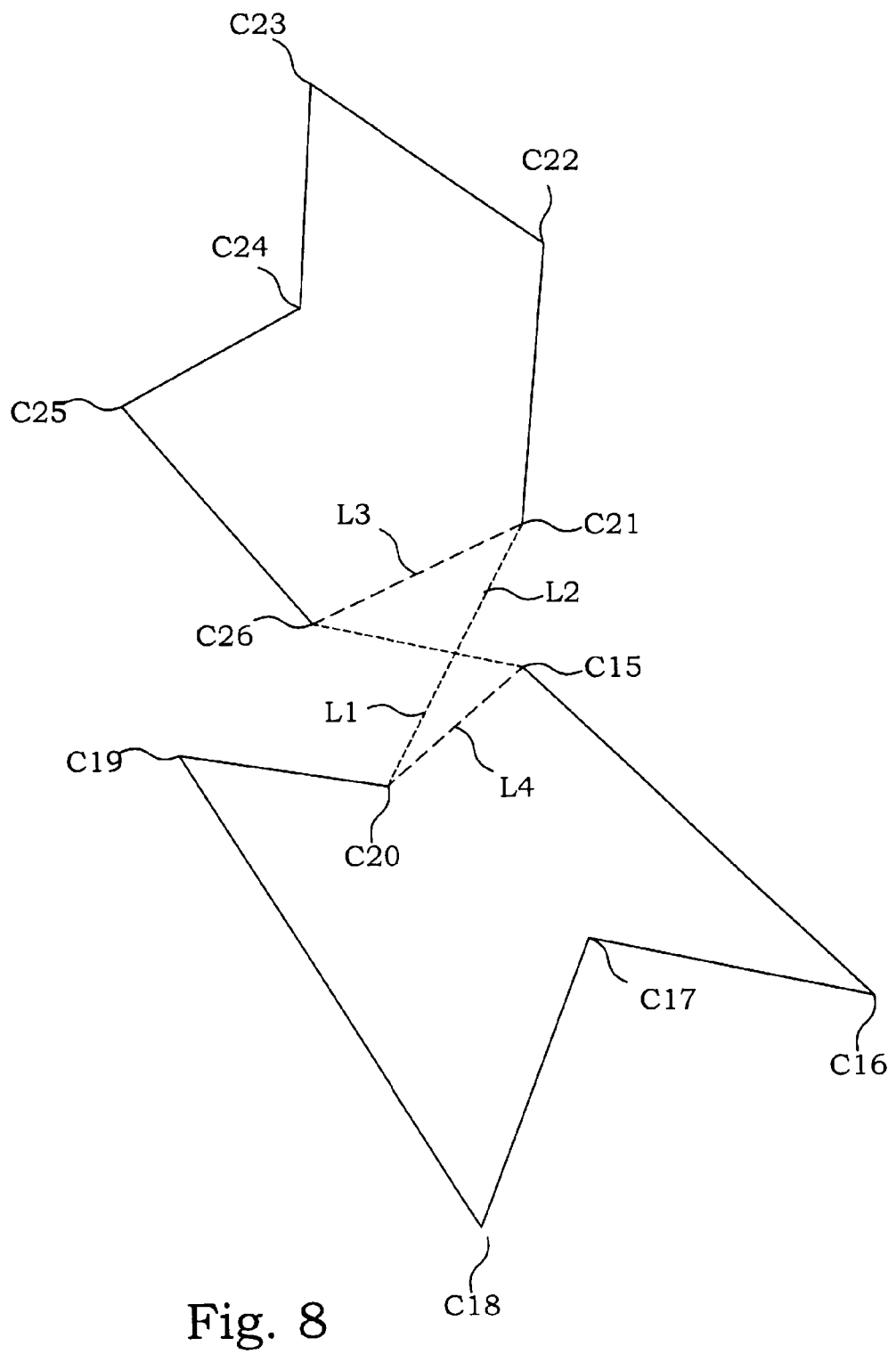
FIG. 8 is an illustration of two separate polygons reported together.

There are more intentional violation possibilities. One more requirement of the true polygon format is that the points should appear in such an order that by connecting each neighboring points by polygon sides, no intersections or crossings between the sides should occur. FIG. 8 illustrates a situation where an intersection is present. The twelve points C15-C26 are reported. However, one realizes that sides drawn between points C20-C21 and C26-C15 do intersect. This can also be used as an indication of that multiple polygons are reported. By dividing the points in two sets of points by removing the crossing sides L1 and L2 gives two groups of points. These groups can each be used for obtaining a well defined polygon, by introducing the sides L3 and L4 instead.

The data defining the polygon points is transmitted in conjunction with other information entities in a common set of data. For instance, a "Positioning Method and Usage" IE is provided in the RANAP and PCAP standards. Such other information, either alone or in combination with the actual point data, can also be used for providing the indication. One possibility is to use an intentional inconsistency between a specified positioning method and a specified type of position data as the indication. As an example, in a typical case, if UE assisted A-GPS is used as a positioning method, the reported geographical area is typically an ellipsoid point with or without altitude and any uncertainty measure if available. However, if the "Positioning Method and Usage" IE indicates the use of UE assisted A-GPS and the reporting data format nevertheless is stated to be a polygon format, an inconsistency is present. A receiver can in such a case, according to predetermined rules agreed with the transmitter, conclude that e.g. a UE assisted A-GPS positioning with too few detected space vehicles is present. The "position" reported by may then instead of an ellipsoid point be multiple points or an area, e.g. defined by one or several polygons. This situation may occur when fewer than 4 space vehicles are detected. Also, the theoretical minimum of at least 4 detected space vehicles (SVs) may indeed be available, yet if one measured pseudo range is biased due e.g. to non line of sight propagation, the problem of having a non-completely determined position may still exist. In table 1, a few intentional inconsistencies between a specified positioning method and a specified type of position data are listed, which can be used as indications.

TABLE 1

Inconsistent reporting cases.

| Positioning method | 'Positioning Method and Usage', bits 4-8 | 'Geographical Area', standard reporting format | 'Geographical Area', non-standard reporting format |
|---|---|---|---|
| UE assisted A-GPS | 00101 | Ellipsoid point with/without altitude + any uncertainty measure | polygon |
| U-TDOA | 01000 | Ellipsoid point + any uncertainty measure | polygon |
| OTDOA | 01001 | Ellipsoid point + any uncertainty measure | polygon |
| RTT | 01011 | Ellipsoid arc | Polygon |

Only positioning methods that are implemented in the RNC or the SAS are listed in Table 1. UE based A-GPS is not likely to exploit the polygon format and the above proprietary rules, when reporting over RRC. Also note that positioning methods already using the polygon format for reporting the geographical area, e.g. cell-ID methods, cannot utilize such inconsistencies.

The invention can also use the "Positioning Method and Usage" directly as an indication, by making use of proprietary formats that are allowed to be reported. In other words, new network specific positioning methods are agreed on, involving the non-standard use of the polygon format. The use is reported by selected "Positioning Method and Usage" codes. The indication is thus a specification of a network specific positioning method.

In the RANAP interface, the "Position Data" container IE is built up from two IEs. The first IE is the "Positioning Data Discriminator" IE whereas the second one is the "Position Data Set" IE. The "Position Data Set" IE is a list of octets (8 bit entities), where bits 4-8 indicate one of the positioning methods applied in order to obtain the reported positioning result, encoded in the "Geographical Area" IE. The first 3 bits of each octet are reserved for other information (e.g. success/failure is indicated), which is not of primary interest for the present invention. According to the RANAP specification, the bits 4-8 are to be interpreted as coding of positioning method, according to Table 2.

The codes 10000 to 11111 can thus be utilized by introduction of new network specific positioning methods (where only the interpretation of the reporting polygon format has been changed).

Although the present invention is described for the RANAP and PCAP interfaces in WCDMA, similar interfaces exist in the CN and in the GSM system as well as in other systems. The present ideas are also applicable to such cases.

The above ideas are preferably implemented in or in connection to receiver and transmitter devices in the communication system. A few non-exclusive examples are given here below.

Figure 9:
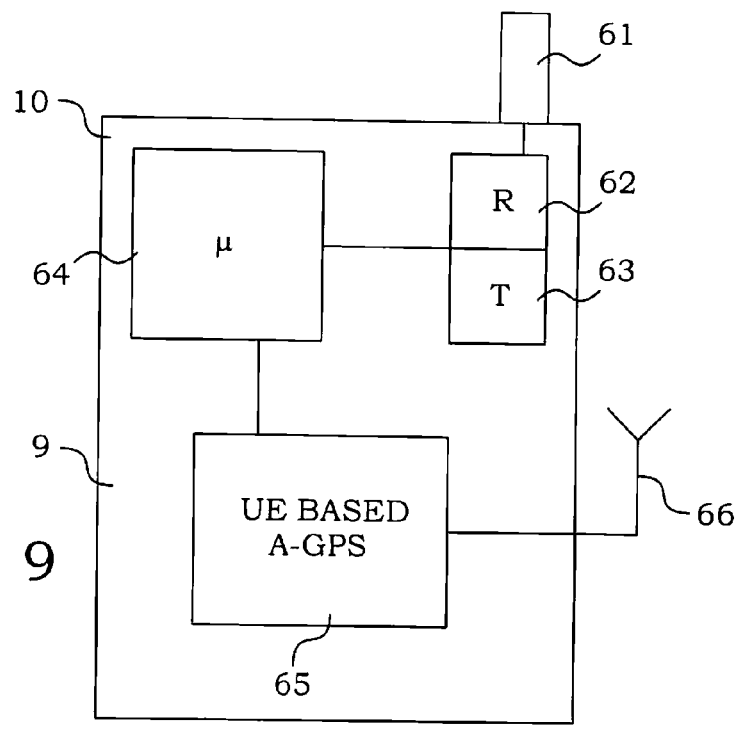
FIG. 9 is a block diagram of parts of an embodiment of a user equipment according to the present invention.

FIG. 9 illustrates a block diagram of an embodiment of a user equipment (UE) 10 according to the present invention, being arranged for UE based A-GPS. The UE 10 is an example of a communication network node 9. An antenna 66 is arranged for receiving satellite ranging signals. The satellite ranging signals are used in an application 65 for UE based A-GPS for procedures are received in a receiver 62 via the communication network and an antenna 61. A processor 64 connected to the receiver 62 and the application 65 extracts the assistance data and provides it to the application 65. The assistance data might involve a coarse position estimation of the UE 10 and such position estimation may be received according to the principles described above.

TABLE 2

RANAP positioning method definitions.

| Bits 4-8 | Positioning method |
|---|---|
| 00000 | Reserved |
| 00001 | Reserved |
| 00010 | Reserved |
| 00011 | Reserved |
| 00100 | Reserved |
| 00101 | Mobile Assisted GPS |
| 00110 | Mobile Based GPS |
| 00111 | Conventional GPS |
| 01000 | U-TDOA |
| 01001 | OTDOA |
| 01010 | IPDL |
| 01011 | RTT |
| 01100 | Cell ID |
| 01101 | Reserved for other location technologies |
| 01110 | Reserved for other location technologies |
| 01111 | Reserved for other location technologies |
| 10000 to 11111 | Reserved for network specific positioning methods. |

A position estimate from the application 65 comprises typically a point to be reported to any positioning node. However, as described further above, there might be situations where not enough satellites are available with line-of-sight, and the positioning may then be degenerated, e.g. into more than one possible point or into several position areas. Such positioning data is provided to the processor 64, which encodes the data according to the principles described further above. The data and the indication of the non-standard use of the polygon format is provided to a transmitter 63 for transmission out over the communication network.

Figure 10:
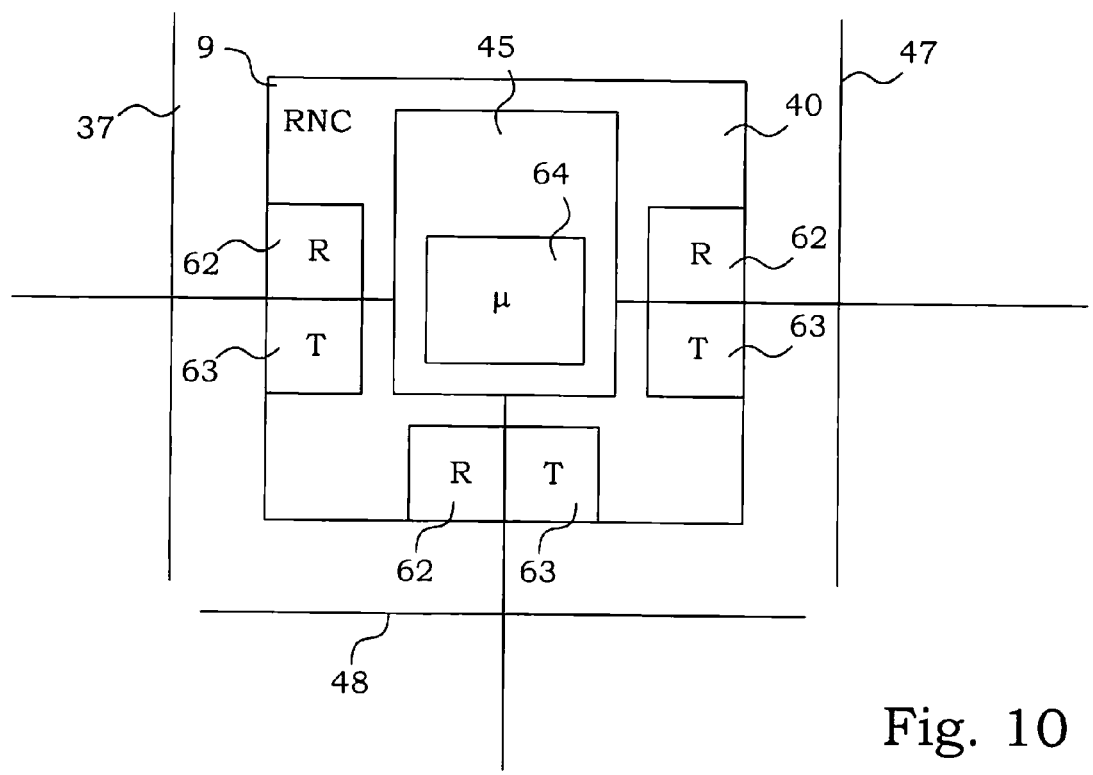
FIG. 10 is a block diagram of parts of an embodiment of an RNC according to the present invention.

FIG. 10 illustrates a block diagram of an embodiment of an RNC 40 according to the present invention. The RNC 40 is an example of a communication network node 9. The RNC 40 communicates via the RRC (Radio Resource Control) interface 37 with the UE's, via the PCAP interface 48 with a SAS and via the RANAP interface 47 with a core network. A positioning node 45 manages most of the positioning issues in the RNC 40. The positioning node 45 comprises a processor 64, operating according to the principles discussed above, for arranging or extracting position data into or from data sets communicated over the different interfaces. The processor 64 is more particularly arranged for including data representing at least two separate position entities or a position entity having information beyond the standardized set of formats in data positions intended for points defining corners of a single polygon. The processor is also arranged for arranging data within the set of data according to predetermined rules as an indication of an existence of the at least two separate position entities or the position entity having information beyond the standardized set of formats. The processor is connected to a transmitter 63 for allowing transmitting of the set of data. In the present embodiment, the processor 64 is connected to a receiver 62 and arranged for reception of a set of data from the communication network. The processor 64 is thereby arranged for detecting an indication within the set of data of an existence of at least two separate position entities or a position entity having information beyond the standardized set of formats. The processor 64 is also arranged for extracting data representing the at least two separate position entities or the position entity having information beyond the standardized set of formats from data positions intended for points defining corners of a single polygon.

In the present embodiment, a respective receiver 62 and transmitter 63 are illustrated for each interface. The transmitter 63 is arranged for transmitting positioning information using a set of data having a standardized set of formats for a single position entity. The receiver 62 is arranged for receiving positioning information using a set of data having a standardized set of formats for a single position entity. However, such functionalities can also be coordinated in a common device.

Figure 11:
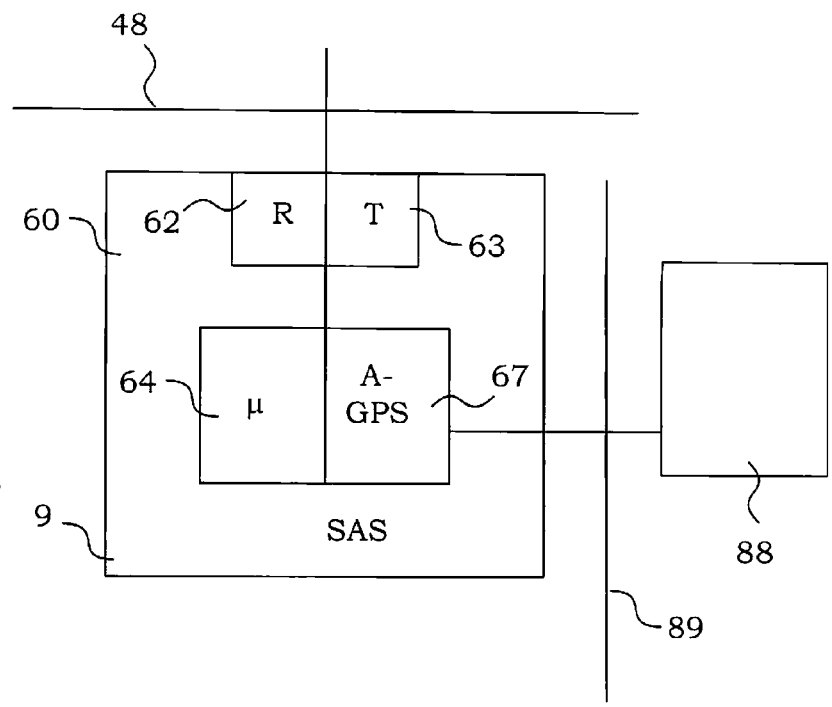
FIG. 11 is a block diagram of parts of an embodiment of a stand-alone A-GPS SMLC according to the present invention.

FIG. 11 illustrates a block diagram of an embodiment of a SAS 60 according to the present invention. The SAS 60 is an example of a communication network node 9. The SAS 60 communicates via the PCAP interface 48 with an RNC. The SAS 60 comprises an application 67 for UE assisted A-GPS. Measurements of satellite ranging signals are provided by a UE via the RNC to the SAS 60. Assistance data may also be achieved from the RNC. Normally, however, assistance data is achieved from an external source 88 over an external interface 89, i.e. a source outside the cellular communication system. Based on this information, an A-GPS position is calculated in the application 67. Depending on the actual implementation and situation, there might be occasions where position data, not fitting into the standard configuration would be required to be sent to or from the SAS. The processor 64 operates according to the principles discussed above, for arranging or extracting position data into or from data sets communicated over the PCAP interface 48 via a receiver 62 and a transmitter 63.

Figure 12:
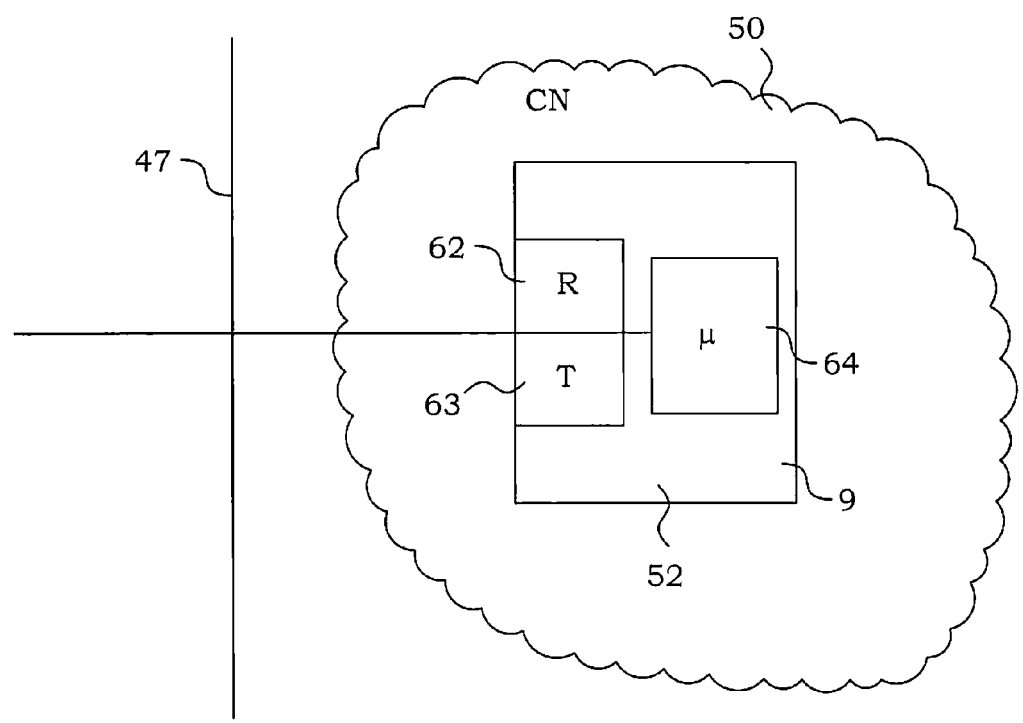
FIG. 12 is a block diagram of parts of an embodiment of a core network node according to the present invention.

FIG. 12 illustrates a block diagram of an embodiment of a node 52 in the core network 50 according to the present invention. The node 52 is an example of a communication network node 9. The node 52 can e.g. be a MSC (Mobile Services Switching Centre). The node 52 communicates via the RANAP interface 47 with an RNC. A processor 64 operates according to the principles discussed above, for extracting position data from data sets being communicated over the RANAP interface 47 via a receiver 62. In certain applications, it might also be of interest to communicate position data also in the opposite direction. The processor 64 operates then according to the principles discussed above, for arranging position data into data sets to be communicated over the RANAP interface 47 via a transmitter 63.

In the embodiments of FIG. 9-12, the nodes have receivers and transmitters as well as a processor arranged both for arranging and extracting position data according to the present invention. Anyone skilled in the art realizes after considering the above description that nodes only having functionality for one of the communication directions are possible, i.e. the processor being arranged for either arranging or extracting position data according to the present invention.

The details of the invention are best explained by a series of examples, where each example considers the geographical regions obtained by the positioning, a typical joint encoding of 'Positioning Method and Usage' and 'Geographical Area', and the achieved improvement as compared to the state of the art.

EXAMPLE 1

This example treats reporting of two well separated points. The well separated points can e.g. be obtained as the intersection points of a two-leg RTT measurement. The encoding can e.g. be performed as follows. "Positioning Method and Usage" is set to 01011, indicating use of RTT measurements. However, the "Geographical Area" is defined as a polygon. The number of points is set to 3 according to standard requirements. However, the combination between an RTT measurement and a polygon report format is an agreed indication of a "two-leg RTT" resulting in two possible position points to be reported. In the agreement is also included that the first point reported is a dummy point.

In the polygon format, first point, S1, the latitude and longitude is set to dummy values, since the receiver is instructed by the indication and the agreement to discard the first point. For S2, the degrees of latitude of S2 is set to the encoded latitude of point 1, and the degrees of longitude of S2 is set to the encoded longitude of point 1. For S3, the degrees of latitude of S3 is set to the encoded latitude of point 2, and the degrees of longitude of S3 is set to the encoded longitude of point 2. By using a dummy point for S1 that is discarded at the receiving end, at least three points are always reported. The maximum number of points that can be reported in this way is 14, one less than the maximum number of points of the polygon.

EXAMPLE 2

This example also treats reporting of two well separated points. The well separated points can as mentioned before e.g. be obtained as the intersection points of a two-leg RTT measurement. The encoding can e.g. be performed as follows. The "Geographical Area" is defined as a polygon. The number of points is set to 2 in violation of standard requirements. The polygon definition can therefore not be used for constructing a true polygon. However, the format is still possible to transmit using e.g. the RANAP interface. When received, the receiver will detect the violation as an agreed indication of a "two-leg RTT" resulting in two possible position points to be reported.

In the polygon format, for the first point, S1, the degrees of latitude of S1 is set to the encoded latitude of point 1, and the degrees of longitude of S1 is set to the encoded longitude of point 1. For S2, the degrees of latitude of S2 is set to the encoded latitude of point 2, and the degrees of longitude of S2 is set to the encoded longitude of point 2. The maximum number of points that can be reported in this way is 2, since a violation of the polygon format does not occur for more than two points.

An enhanced flexibility for reporting results of RTT positioning is thus achieved.

EXAMPLE 3

This example also treats reporting of two well separated points. The well separated points can as mentioned before e.g. be obtained as the intersection points of a two-leg RTT measurement. In this example, the "Positioning Method and Usage" IE, defines any code 10000 to 11111 that is agreed between involved nodes communicating e.g. over RANAP or PCAP. These codes specify network specific positioning methods. This indication is here the Positioning Method and Usage code itself. The "Geographical Area" is according to the agreement set to a polygon having three points. Also here, it is assumed that the agreement states that the last point of the polygon format is a dummy point. For S1, the degrees of latitude of S1 is set to the encoded latitude of point 1, and the degrees of longitude of S1 is set to the encoded longitude of point 1. For S2, the degrees of latitude of S2 is set to the encoded latitude of point 2, and the degrees of longitude of S2 is set to the encoded longitude of point 2. For S3, dummy values are given. The maximum number of points that can be reported in this way is 14, one less than the maximum number of points of the polygon.

The present invention thus can provide an enhanced precision (accuracy) of WCDMA positioning in cases where the positioning renders more than one closed region or more than one point, where the terminal may be located. The enhanced precision results since otherwise the more than one regions or points would have to be merged to one region or point, a fact that necessarily increases the reported uncertainty measure. Consider e.g. the representation of two points by a single point, together with an uncertainty circle that encloses the two original points. It is obvious that the uncertainty circle represents a much larger region than the original points.

EXAMPLE 4

This example treats reporting of two well separated polygons. The polygons can be obtained in different ways. One example is Cell ID positioning, where the cell coverage area is split into separate regions or "islands", e.g. when repeaters are utilized. This is not uncommon in practice. Another example is approaches of adaptive enhanced Cell Identity (AECID) positioning, where the cell coverage area is split into separate regions by the actual probability for occurrence in different locations. Furthermore, in RTT positioning regions may be split due to non-ideal radio propagation. Also, soft handover based positioning may give rise to different polygons for one and the same position, since separate regions of the soft handover region may be requested to be reported as different polygons. More examples are possible to find. In the present example, it is assumed that two polygons are provided by a Cell-ID based positioning method.

The "Positioning Method and Usage" IE can be defined as 01100, i.e. "Cell ID". The "Geographical Area" is defined as a polygon. This format is indeed compatible with a Cell ID positioning method, which is why a consistency violation is not possible to use in this example. The number of points is set to the sum of the number of points for the two polygons. The points are then listed by its degrees of latitude and degrees of longitude according to common practice. However, the first point of the first polygon is selected to be the point closest to the second polygon. The points of the first polygon are then defined in a clockwise order around the first polygon. The first point of the second polygon is likewise selected to be the point closest to the first polygon. The points of the second polygon are then defined in a counter-clockwise order around the second polygon. This gives rise to intersecting or crossing sides when the last point in one polygon is connected to the first point in the other polygon. Thus, a violation of the polygon rules is intentionally introduced, and can be used as an indication of the existence of two polygons. At the receiver side, the indication in the form of the intersection violation is detected and is interpreted according to predetermined rules as an indication of a dual polygon report. The position of the crossing sides can furthermore be used as a definition of where the first polygon ends and the second starts.

EXAMPLE 5

This example treats reporting of three well separated polygons. The polygons can be obtained in different ways, see example 4. The three polygons are in this example assumed to be a result of adaptive enhanced Cell Identity (AECID) positioning, where the cell coverage area is split into separate regions. The "Positioning Method and Usage" IE is set to any code between 10000 and 11111 that is agreed between involved nodes communicating over RANAP or PCAP to be an indication of Cell Identity (AECID) positioning giving multiple polygons. In the present example, it is a request that the actual polygon encoding rules are followed in all aspects. The "Geographical Area" is subsequently defined as a polygon, with the number of points equal to the sum of point of the three separate polygons plus two. The first polygon is defined in a conventional manner. After the last point of the first polygon, a dummy point is introduced, which is placed in a near vicinity of the first point, but not exactly. The additional dummy point may e.g. only differ one quantization step, in latitude or longitude, as compared to the first point of the polygon. The distance between the first point and the dummy point is so small that it would not be meaningful to have real polygon points situated so close to each other. This becomes an indication of where the second polygon starts. The points of the second polygon are then introduced, and a new dummy point is added after the last point of the second polygon. Eventually, the points of the third polygon are added.

At the receiver side, the positioning method and usage code is the indication of that multiple polygons are present. By investigating the distances between the points defined in the list of points, the different polygons can be identified.

EXAMPLE 6

This example treats reporting of polygons with altitude information. The polygons can be obtained in different ways, e.g. by Cell ID positioning, using pre-computed cell polygons with altitude for reporting or AECID positioning, where each polygon corner is augmented with an average altitude, obtained from adjacent high precision position measurements. The "Positioning Method and Usage" IE is given any code from 10000 to 11111 that is agreed between involved nodes communicating over RANAP or PCAP to mean such positioning methods. The "Geographical Area" is defined to be a polygon with the number of points equal to the number of corners of the reported polygon with altitude information plus additional points for carrying altitude information.

Figure 13:
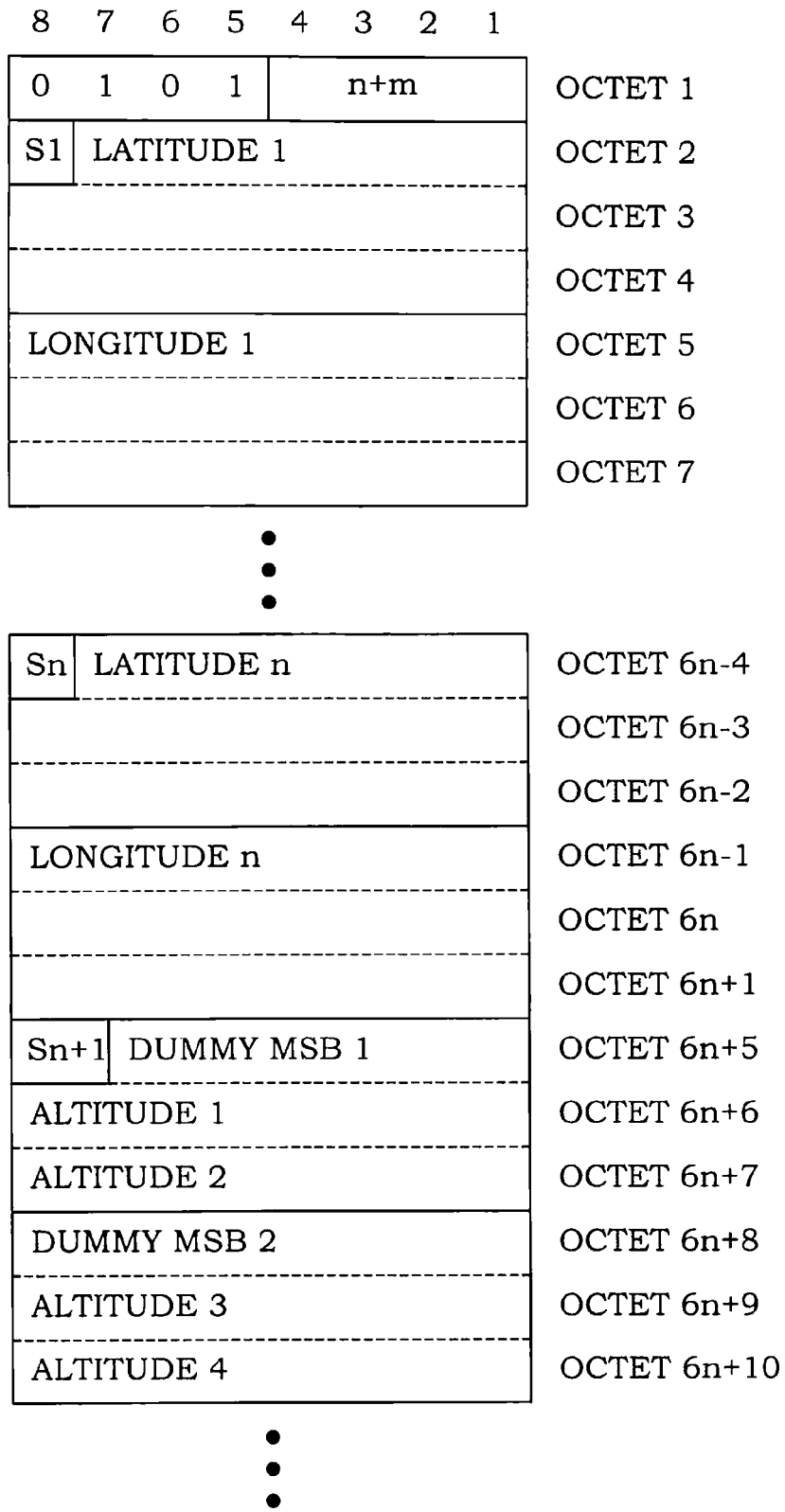
FIG. 13 is an embodiment of a polygon information entity comprising polygon data including altitude information.

Proprietary rules for the encoding of the altitudes of the points of the reported polygon, as additional points need to be introduced. One example is illustrated in FIG. 13. The details on this is not elaborated, however, it should be noted that such rules should meet the standardized encoding rule of the polygon format. Furthermore, the more significant bits of the additional "latitude" and "longitude" should preferably be used to keep the additional points at least in the same geographical region as the ordinary points of the polygon. Preferably, one should encode the altitudes of a pre-specified number of points, in one of the additional points. This would allow for the receiving end to derive the number of points of the polygon (different than the actual reported polygon), thereby enabling a further decoding of points with altitude information. The present invention thus provides a possibility to report altitude of the corners of a reported polygon.

An additional proprietary encoding rule needs to be introduced, in order to detect where polygon descriptions end and start, if multiple polygons are used. One way to obtain this is to mark the end of each polygon with an additional point that only differ one quantization step, in latitude or longitude, as compared to the first point of the polygon, c.f. example 5 above.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Method of transferring positioning information using a set of data having a standardized set of formats for a single position entity, the method comprising:
    including data representing a position entity having information beyond said standardized set of formats in data containers intended for points defining corners of a single polygon;
    arranging data within said set of data according to predetermined rules as an indication of an existence of said position entity having information beyond said standardized set of formats;
    transferring said set of data over a communication network;
    detecting said indication within said set of data of an existence of said position entity having information beyond said standardized set of formats, where said indication is an intentional violation of rules for said points defining corners of a single polygon; and
    extracting data representing said position entity having information beyond said standardized set of formats from said data containers intended for points defining corners of a single polygon.

2. Method according to claim 1, where said position entity having information beyond said standardized set of formats is a polygon with altitude.

3. Method according to claim 1, where said transferring takes place over a RANAP or PCAP interface.

4. Method of transmitting positioning information using a set of data having a standardized set of formats for a single position entity, the method comprising:
    including data representing a position entity having information beyond said standardized set of formats in data containers intended for points defining corners of a single polygon;
    arranging data within said set of data according to predetermined rules as an indication of an existence of said position entity having information beyond said standardized set of formats, where said indication is an intentional inconsistency in said points defining corners of a single polygon; and
    transmitting said set of data to a communication network.

5. Method of transmitting positioning information using a set of data having a standardized set of formats for a single position entity, the method comprising:
    including data representing a position entity having information beyond said standardized set of formats in data containers intended for points defining corners of a single polygon;
    arranging data within said set of data according to predetermined rules as an indication of an existence of said position entity having information beyond said standardized set of formats, where said indication is an intentional inconsistency between a specified positioning method and a specified type of position data; and
    transmitting said set of data to a communication network.

6. Method according to claim 5, where said position entity having information beyond said standardized set of formats is a polygon with altitude.

7. Method according to claim 5, where said transmitting takes place over a RANAP or PCAP interface.

8. Method of receiving positioning information using a set of data having a standardized set of formats for a single position entity, the method comprising:
    receiving the set of data over a communication network;
    detecting an indication within said set of data of an existence of a position entity having information beyond said standardized set of formats, where said indication is an intentional violation of rules for said points defining corners of a single polygon; and
    extracting data representing said position entity having information beyond said standardized set of formats from data containers intended for points defining corners of a single polygon.

9. Method according to claim 8, where said position entity having information beyond said standardized set of formats is a polygon with altitude.

10. Method according to claim 8, where said step of receiving takes place over a RANAP or PCAP interface.

11. Method according to claim 8, where said intentional violation is that fewer than three points defining corners of a single polygon are provided.

12. Method according to claim 8, where said intentional violation is that two points of said points defining corners of a single polygon are identical.

13. Method according to claim 8, where said intentional violation is that said single polygon presents crossing sides.

14. Method of receiving positioning information using a set of data having a standardized set of formats for a single position entity, the method comprising:
    receiving the set of data over a communication network;
    detecting an indication within said set of data of an existence of a position entity having information beyond said standardized set of formats, where said indication is an intentional inconsistency in said points defining corners of a single polygon; and
    extracting data representing said position entity having information beyond said standardized set of formats from data containers intended for points defining corners of a single polygon.

15. Method according to claim 14, where said intentional inconsistency is that two points of said points defining corners of a single polygon are located closer to each other than a predetermined distance, where said predetermined distance is unreasonable for two corners of a true polygon.

16. Method of receiving positioning information using a set of data having a standardized set of formats for a single position entity, the method comprising:
    receiving the set of data over a communication network;
    detecting an indication within said set of data of an existence of a position entity having information beyond said standardized set of formats, where said indication is an intentional inconsistency between a specified positioning method and a specified type of position data; and
    extracting data representing said position entity having information beyond said standardized set of formats from data containers intended for points defining corners of a single polygon.

17. Method according to claim 16, where said indication is a specification of a polygon position data format and a specification of a positioning method selected from the list of:
    User equipment assisted A-GPS;
    User equipment based A-GPS;
    U-TDOA;
    OTDOA; and
    RTT.

18. Method according to claim 8, where said indication is further a specification of a network specific positioning method.

19. Method according to claim 8, where said communication network operates according to WCDMA.

20. Communication network node, comprising:
a transmitter to transmit positioning information using a set of data having a standardized set of formats for a single position entity; and
a processor to include data representing a position entity having information beyond said standardized set of formats in data containers intended for points defining corners of a single polygon;
said processor being further to arrange data within said set of data according to predetermined rules as an indication of an existence of said position entity having information beyond said standardized set of formats, where said indication is an intentional violation of rules for said points defining corners of a single polygon;
said processor being connected to said transmitter for allowing transmitting of said set of data to a communication network.

21. Node according to claim 20, where said position entity having information beyond said standardized set of formats is a polygon with altitude.

22. Node according to claim 20, where said transmitter is connected to a RANAP or PCAP interface.

23. Communication network node, comprising:
a receiver to receive positioning information using a set of data having a standardized set of formats for a single position entity; and
a processor, connected to said receiver and to receive a set of data from a communication network;
said processor being to detect an indication within said set of data of an existence of at least two separate position entities, where said indication is an intentional inconsistency in said points defining corners of a single polygon;
said processor being further to extract data representing said position entity having information beyond said standardized set of formats from data containers intended for points defining corners of a single polygon.

24. Communication network node, comprising:
a receiver to receive positioning information using a set of data having a standardized set of formats for a single position entity; and
a processor, connected to said receiver and to receive a set of data from a communication network;
said processor being to detect an indication within said set of data of an existence of a position entity having information beyond said standardized set of formats, where said indication is an intentional inconsistency between a specified positioning method and a specified type of position data;
said processor being further arranged to extract data representing said a position entity having information beyond said standardized set of formats from data containers intended for points defining corners of a single polygon.

25. Node according to claim 24, where said position entity having information beyond said standardized set of formats is a polygon with altitude.

26. Node according to claim 24, where said receiver is connected to a RANAP or PCAP interface.

27. Node according to claim 24, wherein said communication network operates according to WCDMA.

\* \* \* \* \*